United States Patent
Lin

(10) Patent No.: US 12,342,374 B2
(45) Date of Patent: Jun. 24, 2025

(54) COMMUNICATION METHOD, TELECOMMUNICATION SYSTEM, NETWORK NODE, BASE STATION AND USER EQUIPMENT

(71) Applicant: GUANGDONG OPPO MOBILE TELECOMMUNICATIONS CORP., LTD., Dongguan (CN)

(72) Inventor: Hao Lin, Neuilly sur Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 420 days.

(21) Appl. No.: 17/822,659

(22) Filed: Aug. 26, 2022

(65) Prior Publication Data

US 2022/0408487 A1 Dec. 22, 2022

Related U.S. Application Data

(63) Continuation of application No. PCT/IB2021/000121, filed on Feb. 26, 2021.

(30) Foreign Application Priority Data

Feb. 26, 2020 (WO) .................. PCT/IB2020/000464

(51) Int. Cl.
*H04W 74/0816* (2024.01)
*H04W 74/00* (2009.01)
*H04W 74/08* (2009.01)

(52) U.S. Cl.
CPC ..... *H04W 74/0816* (2013.01); *H04W 74/006* (2013.01); *H04W 74/0866* (2013.01)

(58) Field of Classification Search
CPC .......... H04W 74/0816; H04W 74/006; H04W 74/0866
See application file for complete search history.

(56) References Cited

U.S. PATENT DOCUMENTS

2021/0144717 A1* 5/2021 Tsai .................. H04W 8/24
2023/0156572 A1* 5/2023 Reial ............. H04W 52/0229
370/329

FOREIGN PATENT DOCUMENTS

WO 2020091080 A1 5/2020
WO 2020196804 A1 10/2020

OTHER PUBLICATIONS

LG Electronics (LG Electronics, Physical layer design of DL signals and channels for NR-U, 3GPP TSG RAN WG1 #98bis, R1-1910817, Chongqing, China, Oct. 14-20, 2019; hereinafter NPL1) (Year: 2019).*

(Continued)

*Primary Examiner* — Michael A Keller
(74) *Attorney, Agent, or Firm* — PERKINS COIE LLP

(57) ABSTRACT

A communication method for communicating with a telecommunication system is provided, with a network node, a base station and a UE coordinately implementing the method. The telecommunication system transmits a control message comprising a channel occupancy duration COD field configured to indicate a duration candidate, such that the UE is configured with control message and enabled to perform transmission and/or reception over the unlicensed spectrum within a remaining channel occupancy duration RCOD determined from the control message.

19 Claims, 6 Drawing Sheets

(56) References Cited

OTHER PUBLICATIONS

3GPP TSG RAN WG1 #98bis R1-1910817, Chongqing, China, Oct. 14-20, 2019, Agenda Item: 7.2.2.1.2, Source: LG Electronics, Title: Physical layer design of DL signals and channels for NR-U, Document for: Discussion and decision (16 pages).
3GPP TSG RAN WG1 Meeting #100e R1-2000960, Feb. 24-Mar. 6, 2020, Agenda item: 7.2.2.2.5, Source: Qualcomm Incorporated, Title: TP for wideband operation for NR-U, Document for: Discussion and Decision (4 pages).
3GPP TSG RAN WG1 #98bis R1-1910457, Chongqing, China, Oct. 14-20, 2019, Agenda item: 7.2.2.1.2, Source: Samsung, Title: DL signals and channels for NR-U, Document for: Discussion and Decision (6 pages).
3GPP TSG RAN WG1 Meeting #100-e R1-2000195, Feb. 24-Mar. 6, 2020, Agenda Item: 7.2.2.1.2, Source: Huawei, HISilicon, Title: Corrections on PDCCH/GC-PDCCH monitoring procedure in TS38. 213, Document for: Discussion and Decision (13 pages).
International Search Report in the international application No. PCT/IB2021/000121, mailed on Jul. 2, 2021 (5 pages).
Written Opinion of the International Search Authority in the international application No. PCT/IB2021/000121, mailed on Jul. 2, 2021 (7 pages).

\* cited by examiner though the transceiver for accessing unlicensed spectrums in a telecommunication system. Since the detailed steps performed in the base station are

COMMUNICATION METHOD, TELECOMMUNICATION SYSTEM, NETWORK NODE, BASE STATION AND USER EQUIPMENT

CROSS-REFERENCE TO RELATED APPLICATION

This is a continuation application of International Patent Application No. PCT/IB2021/000121, filed on Feb. 26, 2021, entitled "COMMUNICATION METHOD, TELECOMMUNICATION SYSTEM, NETWORK NODE, BASE STATION AND USER EQUIPMENT", which claims priority to International Patent Application No. PCT/IB2020/000464, filed on Feb. 26, 2020. The disclosures of which are hereby incorporated by reference in their entirety.

BACKGROUND

In an unlicensed band, an unlicensed spectrum is known as a shared spectrum. Various communication devices in different telecommunication systems are allowed to use the unlicensed spectrum as long as the usage meets regulatory requirements set force by the jurisdictions of the region. There is no need to apply for any proprietary spectrum authorization from the jurisdictions.

To allow multiple telecommunication systems to share the unlicensed spectrum for wireless communication without confliction, some countries or region administrations have issued mandatory requirements to use the unlicensed spectrum. For example, a communication device is required to follow a listen before talk (LBT) procedure, that is, the communication device needs to perform a channel sensing before transmitting signals over a channel. When an outcome of the LBT procedure indicates that the channel is idle, the communication device can perform signal transmission; otherwise, the communication device cannot perform signal transmission. To ensure fair of use, once a communication device successfully occupies the channel, a transmission duration cannot exceed a maximum channel occupancy time (MCOT).

In new radio-based access to unlicensed spectrums (NRU) communication, when a UE intends to perform uplink transmissions, the LBT procedure, also known as a channel access procedure, is firstly performed. However, how to indicate an outcome of the LBT procedure, is still an open issue.

Furthermore, in an NRU wideband operation, a base station (BS) such as gNB and a UE can communicate in a wider band including resource block (RB) sets. The NR spec release 15 has defined a concept of bandwidth-in-part (BWP). A UE in the NRU wideband operation can be configured with an active BWP including multiple RB sets. However, by regulation, priori to each transmission in the spectrum, a sender needs to perform the LBT procedure. This implies that before transmissions of multiple RB sets, a multi-RB set-based LBT procedure has to be performed. If an outcome of the multi-RB-set based LBT procedure is undeterminable for the UE or the BS, the subsequence transmission cannot be proceeded.

Therefore, it is desirable to have a method for a physical layer of a communication device to indicate to a higher layer of the communication device about an outcome of a channel access procedure, i.e., the outcome of the LBT procedure.

SUMMARY

The present disclosure relates to telecommunication, and more particularly, to a method for communication in a telecommunication system comprising one or more base stations, allowing a user equipment (UE) to access unlicensed spectrums with performance and reliability.

In one aspect of the present application, a communication method is provided for a UE to communicate in a telecommunication system comprising a core network and at least one base station operating in a serving cell. When a first information is received from the base station, the UE uses the first information to determine a remaining channel occupancy duration (RCOD) of the base station.

The embodiment of the communication method described above can be executed by a user equipment (UE), which is also incorporated in one of the subject matters claimed in the present application. The UE may comprise a processor, a memory device, and a transceiver, wherein the memory device comprises program codes executable by the processor to perform a method through the transceiver for accessing unlicensed spectrums in a telecommunication system. Since the detailed steps performed in the UE are described in the communication method above, detailed descriptions would be omitted herein.

In another aspect of the present application, the proposed method may not be limited to UE. Any network node in the telecommunication system may be adaptable. Therefore, a communication method is provided for a network node to access unlicensed spectrums in a serving cell of a telecommunication system.

Firstly, a configuration message is received by the network node, comprising a duration candidate list comprising a plurality of duration candidates.

Secondly, a control message is received by the network node, comprising information for determining a RCOD.

Thereafter, the network node determines RCOD to occupy the unlicensed spectrum based on the configuration message and the control message.

The embodiment of the communication method described above is executed by a network node, which is also incorporated in one of the subject matters claimed in the present application. The network node may comprise a processor, a memory device, and a transceiver, wherein the memory device comprises program codes executable by the processor to perform the method through the transceiver for accessing unlicensed spectrums in a telecommunication system. Since the detailed steps performed in the network node identical to the embodiment of communication method above, redundant descriptions would be omitted herein.

In a further aspect of the present application, a communication method implemented by the system side is provided. The system side may be referred to as any higher layer nodes in the telecommunication system and is not limited to a base station, an eNB or a gNB. In the embodiment of a communication method, a network node is enabled to access unlicensed spectrums in a serving cell of a telecommunication system. The telecommunication system may firstly transmit, through a base station, a configuration message comprising a duration candidate list comprising a plurality of duration candidates, and then transmits a control message comprising information for determining a RCOD. A network node (such as a mobile station or a UE) is therefore enabled by the configuration message and the control message to occupy the unlicensed spectrum accordingly.

The embodiment of the communication method executable from the system side, may be partially involved with a base station comprising a processor, a memory device, and a transceiver, wherein the memory device comprises program codes executable by the processor to perform the method through the transceiver. Since the detailed steps are basically symmetric to the other embodiment, redundant descriptions would be omitted herein.

In a further aspect of the present application, a communication method in a telecommunication system is provided. The telecommunication system may comprise at least a base station providing services to one or more UEs within one or more serving cells.

Firstly, the telecommunication system transmits a configuration message comprising a duration candidate list comprising a plurality of duration candidates, such that a UE is configured with the duration candidate list when successfully decoding the configuration message.

Thereafter, the telecommunication system transmits a control message comprising a COD field configured to indicate a candidate duration, such that the UE is configured with the COD field when successfully decoding the control message.

The described communication method in the telecommunication system is essentially a communication protocol jointly implemented by a plurality of network nodes such as base stations within the telecommunication system, and the UE. Therefore, embodiments of the UE, the base station, and the telecommunication systems are also introduced herewith, and protected by the claims. Since the method does not involve substantial hardware modifications, detailed description about hardware structures of the described UE, base station, communication would be omitted.

In another aspect of the present application, an embodiment of a telecommunication system is provided. The telecommunication system comprises at least a base station providing services to one or more user equipment UE within one or more serving cells to implement the described method for accessing unlicensed spectrum.

In a further aspect of the application, an embodiment of a base station is provided. The base station is one of the network nodes contained in a telecommunication system. The base station comprises a processor, a memory device, and a transceiver working together to communicate with the telecommunication system and the UE.

A further embodiment of a UE is provided. The UE may comprise at least a processor, a memory device, and a transceiver working together for accessing unlicensed spectrums in a telecommunication system comprising at least a base station providing services within one or more serving cells.

BRIEF DESCRIPTION OF THE DRAWINGS

The technical solution and other beneficial effects of the application will be obvious through the detailed description of the specific implementation mode of the application in combination with the attached drawings.

DETAILED DESCRIPTION

The specific structural and functional details disclosed herein are only representative and are for the purpose of describing exemplary embodiments of the present application. However, the present application can be realized in many alternative forms, which shall not be interpreted as limited only to the embodiments described herein.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In the technology area of new radio-based access to unlicensed spectrums (NRU), when a user equipment (UE) intends to transmit uplink transmission, a listen before talk (LBT) procedure is required, also referred to as a channel access procedure. In one embodiment of the present application, an outcome of the LBT procedure may be utilized by the UE to improve the NRU communication. For example, a higher layer in the UE may be configured to learn from the physical layer in the UE the information of how often the channel is sensed to be idle (i.e., LBT success) or not (i.e., LBT failure). Therefore, a method is provided for a physical layer in a user equipment UE to indicate to the higher layer in the UE about an outcome of the LBT procedure.

Figure 1:
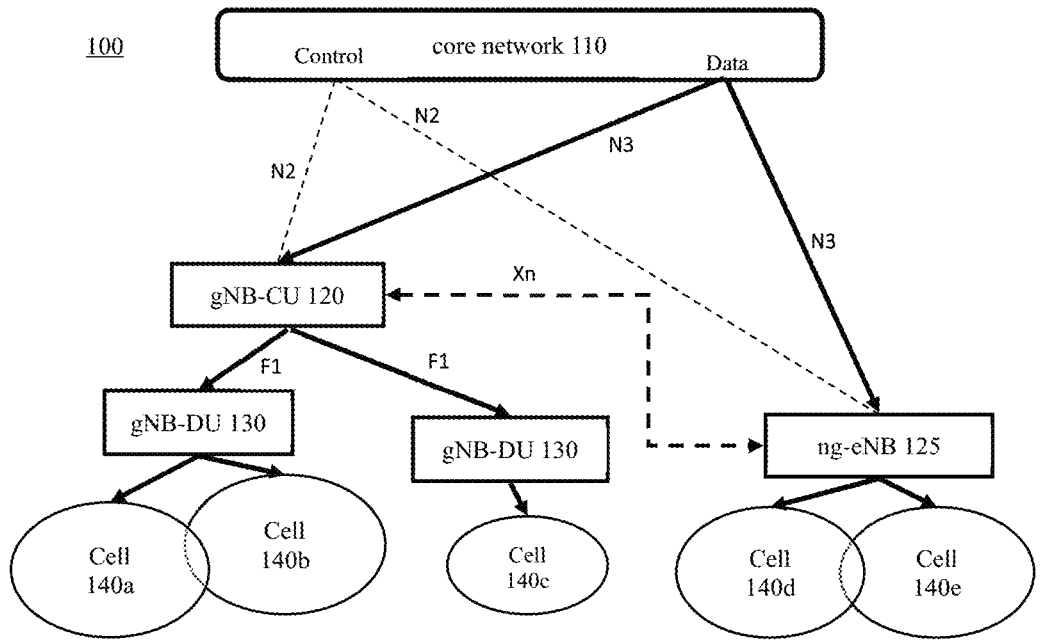
FIG. 1 shows an embodiment of telecommunication system 100 providing the network services based on new radio (NR) specifications.

FIG. 1 shows an embodiment of a telecommunication system 100 providing network services based on new radio (NR) specifications, comprising a core network 110 interconnected to a plurality of base stations distributed around. In 5G NR networks, the base stations may further be categorized into a control unit (CU) gNB-CU 120 and a distributed unit (DU) gNB-DU 130. The gNB-CU 120 is connected to the core network 110 through a control plane interface N2 and a user plane interface N3. The gNB-CU 120 may be interconnected to the distributed unit (DU) gNB-DU 130 over F1 interface. A logical interface Xn (i.e., X2) may be defined for a gNB-CU 120 to interconnect with another base stations. A 4G base station ng-eNB 125 may also be capable of interconnecting with the core network 110 through the control plane interface N2 and the user plane interface N3, and interconnecting with the gNB-CU 120 through the logical interface Xn. The cells 140a-140e are representing areas under coverage of the gNB-Dus 130 or the ng-eNB 125. The base station described, is known to be an eNB in the LTE standard. In the NR standard, however, a base station becomes a generalized term covering the functions of a gNB-CU and a gNB-DU. The wireless interconnections between the UEs and the base stations is referred to as the Next Generation Radio Access Network (NG-RAN). The proposed embodiments of the communication method can therefore be implemented by network nodes including but not limited to the gNB-DUs 130, the ng-eNB 125, the gNB-CUs 120, and UEs (not shown) by working together with the core network 110. It is to be understood that the proposed method disclosed are merely software implementations without hardware change. No further introduction is needed because the infrastructure and hardware arrangements of the telecommunication system 100 are following the known standard.

Figure 2:
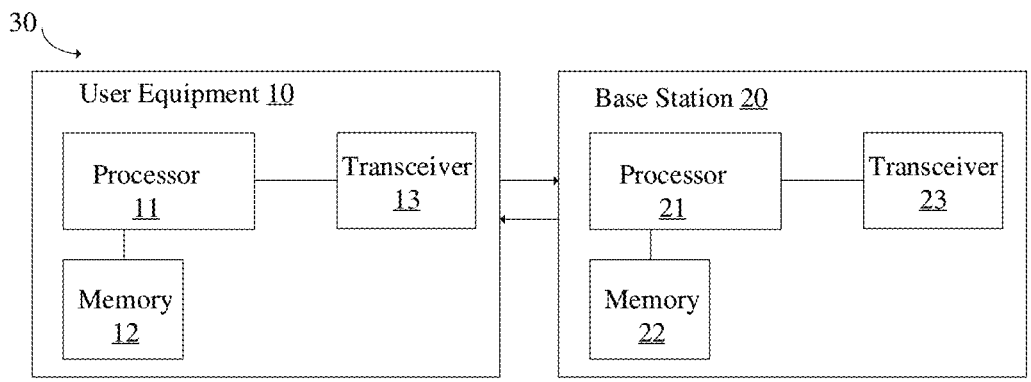
FIG. 2 illustrates a systematic diagram wherein a user equipment (UE) 10 is wirelessly connected to a telecommunication system 30 comprising multiple network nodes, such as base stations (BS) (e.g., gNB) 20.

FIG. 2 illustrates a more generalized systematic diagram wherein a user equipment (UE) 10 is wirelessly connected to a telecommunication system 30 comprising multiple network nodes, such as base stations (BS) (e.g., gNB) 20. The telecommunication system 30 includes multiple BSs 20 providing communication services through one or more cells, so that the UEs 10 within coverages of the cells are able to connect to the core network. In modern telecommunication systems such as 5G long term evolution (LTE) or new radio (NR) systems, there are multiple network nodes distributed in various service layers to corporately provide the communication service.

The UE 10 may include a memory 12, a transceiver 13, and a processor 11 coupled to the memory 12, the transceiver 13. Likewise, the base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal. The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

To enable NRU communication in a telecommunication system, the core network may generate a channel occupancy time (COT) configuration and transmit the COT configuration to configure one or more UEs within corresponding serving cells, such that the UEs are able to accordingly occupy the unlicensed channels within proper time slots without traffic jamming. For example, a UE within coverages of one or more serving cells can be configured by the core network with a parameter co-DurationPerCellList-r16 presenting a list of channel occupancy durations for each serving cell (co-DurationPerCell-r16). For each serving cell among the one or more serving cells, the UE can further be provided with a parameter servingCellId indicating an identity of the corresponding serving cell. Furthermore, a reference sub carrier spacing (SCS) configuration for channel occupancy duration indication is provided to the UE through a parameter SubCarrierSpacing, and a location of a COD field may be provided to the UE in a DCI format 2_0 message.

A DCI message provides the UE with the necessary information such as physical layer resource allocation, power control commands, HARQ information for both uplink and downlink. A DCI message is transmitted on the Physical Downlink Control Channel (PDCCH) with 24-bit CRC attachment (16-bit for LTE). The increase in the CRC size reduces the risk of incorrect reception at the receiver end. Multiple DCI formats are defined to meet different needs but the number of DCI formats are reduced as compared to LTE. Unlike LTE DCI formats, several of NR DCI formats can share same DCI size.

A DCI format 2_0 message is known to be used for the notification of slot format information. In other words, a DCI format 2_0 message is used to dynamically change the slot format. A DCI format 2_0 message with CRC scrambled by SFI-RNTI carries the following information: Slot format indicator 1, Slot format indicator 2, . . . , and Slot format indicator N. The size of a DCI format 2_0 message is configurable by the RRC layer up to 128 bits. In the data structure of the DCI format 2_0 message, a field value positionInDCI indicates the starting position (bit) of a slot format index ID (SFI-Index, slotFormatCombinationId) for the serving cell (servingCellId) within the DCI payload.

For NRU communication, a DCI format 2_0 message can be used for notifying available RB sets, in addition to channel occupancy duration, search space set group switching, and slot format (as in Rel-15). Especially for indicating available RB sets, the UE can be provided with a location of a bitmap in the DCI format 2_0 message, having a one-to-one mapping with a set of RB sets of the serving cell, where a value of '0' indicates that an RB set is available for receptions and a value of '1' indicates that an RB set is not available for receptions. The DCI format 2_0 message may be used to provide further functionalities in addition to available RB set indication. Since a base station may not always deliver correct information at the beginning of a downlink (DL) burst. An SFI-index field of the DCI format 2_0 message transmitted at the beginning of the DL burst could be particularly useful when something goes wrong.

Figure 3A:
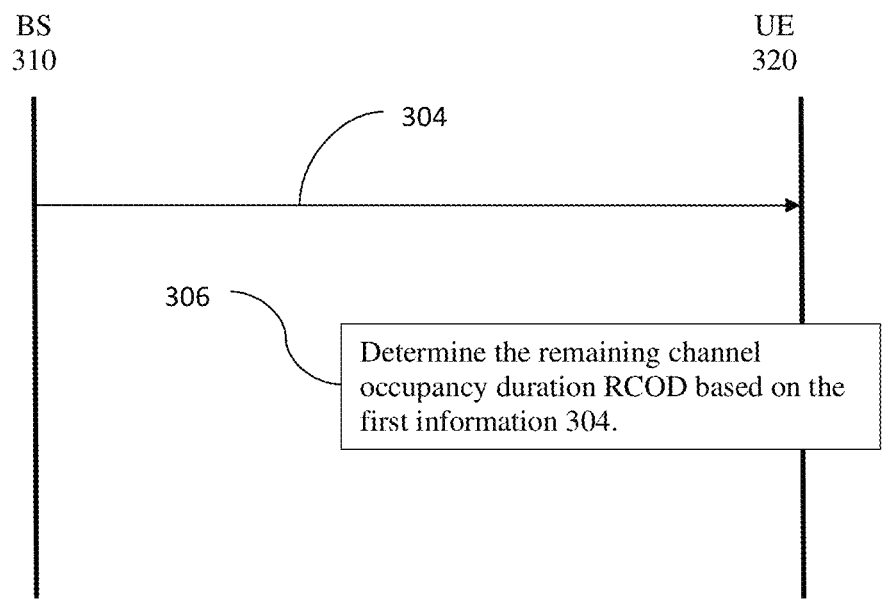
FIGS. 3A and 3B show handshake diagrams of the communication method according to an embodiment of the present application.

In one aspect of the present application, a communication method is provided for a UE to occupy unlicensed spectrums in a telecommunication system comprising a core network and at least one base station operating in a serving cell. FIG. 3A shows a handshake diagram of the communication method according to an embodiment of the present application. A first information 304 is firstly received from a base station (BS) 310, wherein the first information 304 is used to determine a RCOD corresponding to a serving cell. Preferably, the first information is something related to the channel occupancy time (COT) duration configured by an RRC message (RRC configuration).

Specifically, the first information 304 may comprise a DCI format 2_0 message. The first information 304 may further comprise a first indication field and/or a second indication field (not shown). In step 306, the UE 320 may determine the channel occupancy duration based on the first information 304. Specifically, the channel occupancy duration may be determined using the first indication field in the first information 304.

In a further embodiment, the first indication field may be configured to indicate a candidate duration among a set of duration candidates. In an embodiment, the set of duration candidates may be configured by the core network or the base station.

Figure 3B:
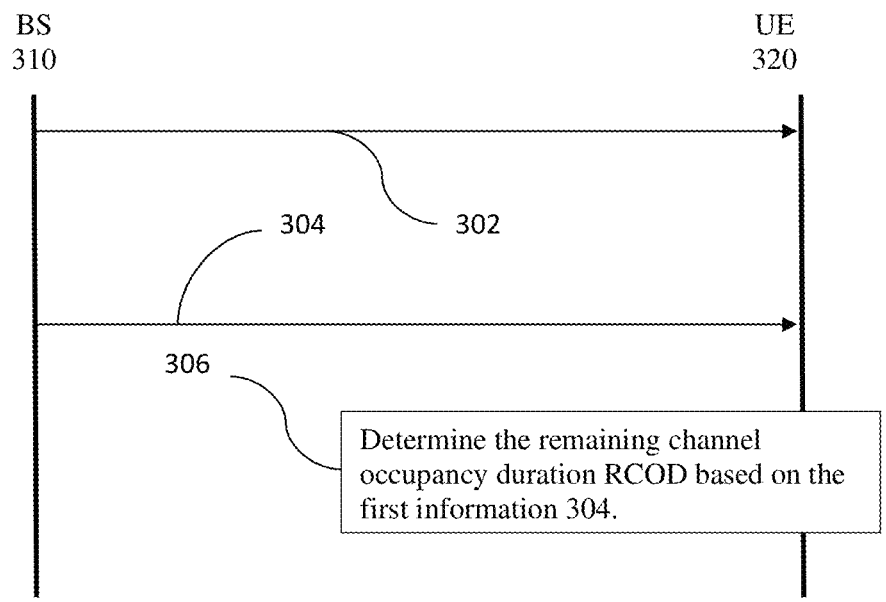

FIG. 3B shows another handshake diagram of the communication method according to an embodiment of the present application. A set of duration candidates (not shown) may be configured through a RRC message 302. Specifically, the UE may be configured with the set of duration candidates before receiving the first indication field from the first information 304.

Preferably, the first indication field is a channel occupancy duration field configured in DCI format 2_0. When he first indication field in the first information 304 was created, it may be configured with a length of M bits, where the length value M is an integer. In an embodiment, the length value M may be determined by a roundup function $[\log_2 N]$ or max $\{\lceil \log_2 N \rceil, 1\}$, where N is a number of the set of duration candidates.

In an embodiment of the present application, the duration indicated in the first indication field may comprise one or more symbols or slots.

In some cases, the first indication field may not be provided in the DCI format 2_0 message or not successfully transmitted to the UE. The UE may assess the first indication field as absent when information of channel occupancy duration per cell co-DurationPerCell-r16 is not provided or unavailable. In the absence of the first indication field, the embodiment allows the UE to use the second indication field to determine the RCOD for the serving cell when the first indication field is absent. Specifically, the second indication field may be an SFI-index field value indicating slot formats of a number of slots. For example, the RCOD may be assessed as a number of slots having certain slot formats specified by the SFI-index field value. A slot format indicates how each of symbols within a single slot is used. It defines which symbols are used for uplink and which symbols are used for downlink within a specific slot. In LTE TDD, if a subframe (equivalent to a slot in NR) is configured for DL or UL, all of the symbols within the subframe should be used as DL or UL. In NR, the symbols within a slot can be configured in various ways. A table "Slot formats for normal cyclic prefix" is defined in TS 38.213 showing that symbols within a slot may be defined as uplink (U), downlink (D), or flexible (F). In an embodiment of the present application, the RCOD can be determined based on the slots or symbols having particular slot formats. For example, a consecutive of slots/symbols of slot format U or F can be counted as the RCOD. Alternatively, only slots/symbols of format F may be counted as the RCOD.

Preferably, the RCOD for the serving cell may be determined to be a number of slots starting from the slot where the UE detects the first information 304. Specifically, a start point of the RCOD can be assessed as a slot where first indication field or the second indication field is detected. That is, a start point of the RCOD is dependent on the timing when the first or second indication field is received and detected by the UE.

Furthermore, when the UE obtains the COD field or the SFI-index field value, switching points of the uplink and downlinks are checked to determine the RCOD. If more than one uplink to downlink UL-to-DL switching points are determined in the range of the RCOD, the UE may deem a first occurred UL-to-DL switching point as an end point of the RCOD. That is, any UL-to-DL switching points occurred in the range of RCOD would terminate the RCOD.

Figure 4:
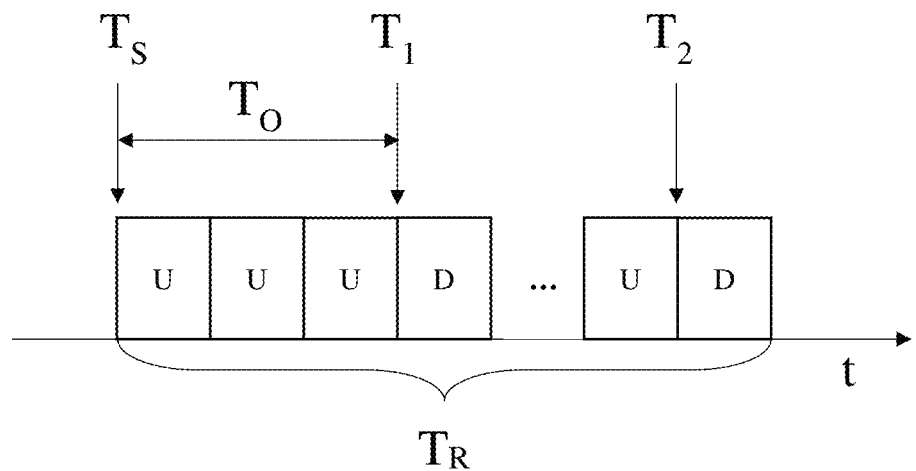
FIG. 4 shows a timeline of UL and DL transport blocks according to an embodiment of the present application.

FIG. 4 shows a timeline of UL (U) and DL (D) transport blocks according to an embodiment of the present application. It is shown that during a RCOD $T_R$ is started at the time point $T_S$. Two UL-to-DL switching points occur at $T_1$ and $T_2$. As described, the UE would terminate the channel occupancy at the first switching point $T_1$, to ensure that the successive transmission are not conflicted. That is, the actual occupancy duration would be a shorter duration $T_O$ than the RCOD $T_R$. As an example, the time unit shown in the time axis t may be slot or symbol.

Furthermore, if the UE is configured to receive a physical downlink shared channel (PDSCH) or a channel state information reference signal (CSI-RS) in a set of symbols within a slot, the UE may receive the PDSCH or the CSI-RS only when all criteria are met; wherein the criteria comprises: the SFI-index field value indicating that the set of symbols within the slot are downlink and within a range of the RCOD. In a further embodiment, a further criterion may also be satisfied before the UE receives the PDSCH or the CSI-RS. That is, in the range of the RCOD, no set of symbols in a slot prior to the PDSCH or the CSI-RS is indicated as uplink by the SFI-index field value.

The embodiment of the communication method described above is executed by a user equipment (UE), which is also incorporated in one of the subject matters claimed in the present application. The UE may comprise a processor, a memory device, and a transceiver, wherein the memory device comprises program codes executable by the processor to perform a method through the transceiver for accessing unlicensed spectrums in a telecommunication system.

Figure 5:
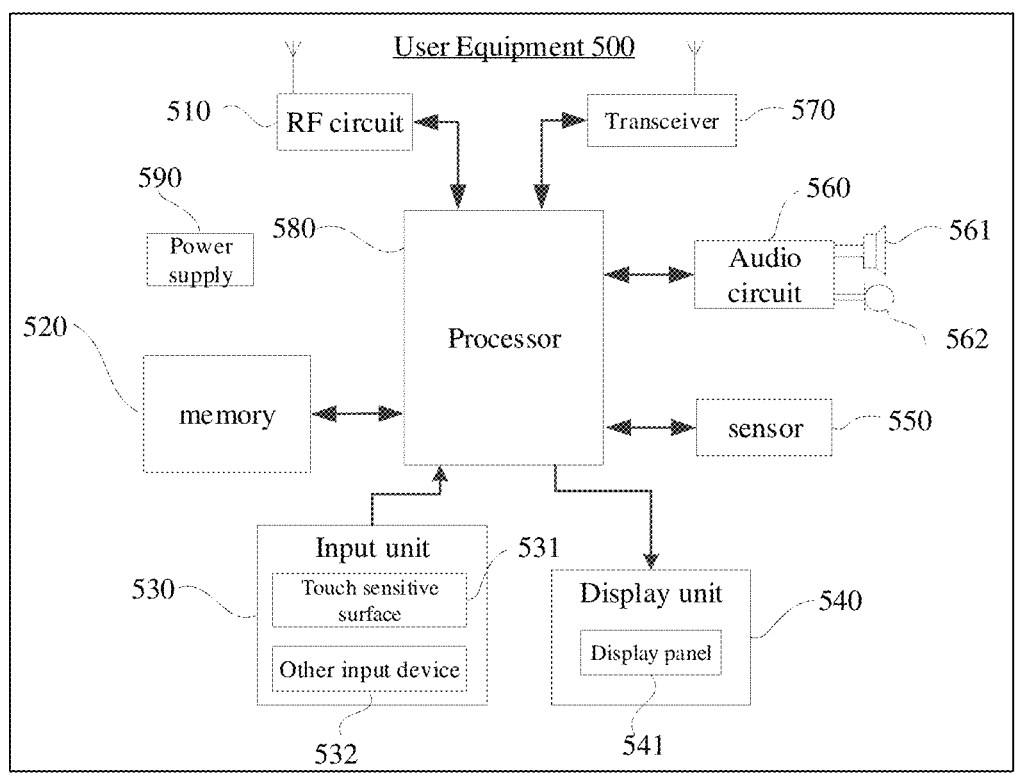
FIG. 5 shows an embodiment of a mobile terminal according to an embodiment of the present application.

FIG. 5 shows an embodiment of a mobile terminal according to an embodiment of the present application. The UE described in the aforementioned embodiments can be a mobile station (a.k.a., mobile phone, mobile terminal, user equipment, etc.) The user equipment 500 may include a radio frequency (RF) circuit 510, a memory device 520 including one or more (only one shown in the figure) computer-readable storage media, an input unit 530, a display unit 540, a sensor 550, an audio circuit 560, a transceiver 570, a processor 580 including one or more (only one shown in the figure) processing core, a power supply 590, and other components. Those skilled in the art may understand that the structure of the user equipment 500 shown in FIG. 5 does not constitute a limitation on the described methods, and may include more or fewer components than those illustrated, or a combination of certain components, or different components layout.

Wherein, the RF circuit 510 is used to receive and transmit electromagnetic waves, realizing mutual conversion of electromagnetic waves and electrical signals, and thereby communicate with a communication network or other devices. The RF circuit 510 may include various existing circuit elements for performing these functions, such as an antenna, a radio frequency transceiver, a digital signal processor, an encryption/decryption chip, a subscriber identity module (SIM) card, a memory, and so on. The RF circuit 510 can communicate with various networks such as the Internet, an intranet, a telecommunication system, or communicate with other devices through the telecommunication system. The aforementioned telecommunication system may include a cellular telephone network, a wireless local area network, or a metropolitan area network. The above telecommunication system can use various communication standards, protocols and technologies, including but not limited to Global System for Mobile Communication (GSM), Enhanced Data GSM Environment (EDGE), broadband codes Wideband Code Division Multiple Access, WCDMA), Code Division Access (CDMA), Time Division Multiple Access (TDMA), wireless fidelity (Wi-Fi) (such as American electrical and electronic engineering Association standards IEEE 802.11a, IEEE 802.11b, IEEE802.11g and/or IEEE 802.1 In), Voice over Internet Protocol (VoIP)

Worldwide Interoperability for Microwave Access (WiMax), other Protocols for mail, instant messaging and short messages, and any other suitable communication protocols, and may even include those that have not yet been developed.

The memory device 520 may be used to store software programs and modules, such as the communication method described. The processor 580 stores the software programs and modules to perform various functional applications and data processing, that is, to realize the communication method as described in the above embodiments. The memory device 520 may include a high-speed random-access memory, and may also include a non-volatile memory, such as one or more magnetic storage devices, flash memory, or other non-volatile solid-state memory. In some examples, the memory device 520 may further include memories remotely provided with respect to the processor 580, and these remote memories may be connected to the user equipment 500 through a wireless medium.

The input unit 530 may be used to receive input digital or character information, and generate keyboard, mouse, joystick, optical, or trackball signal inputs related to user settings and function control. Specifically, the input unit 530 may include a touch-sensitive surface 531 and other input devices 532. The touch-sensitive surface 531, also known as a touch screen or touchpad, can collect user's touch operations on or near it (for example, the user uses any suitable objects or accessories such as fingers, stylus, etc. on the touch-sensitive surface 531 or in operation near the touch-sensitive surface 531), and drive the corresponding connection device according to a preset program. Optionally, the touch-sensitive surface 531 may include a touch detection device and a touch controller. Among them, the touch detection device detects the user's touch orientation, and detects the signal brought by the touch operation, and transmits the signal to the touch controller; the touch controller receives touch information from the touch detection device, and converts it into contact coordinates, and then sends to the processor 580, and can receive the command sent by the processor 580 and execute it. In addition, the touch-sensitive surface 531 may be implemented in various types such as resistive, capacitive, infrared, and surface acoustic waves. In addition to the touch-sensitive surface 531, the input unit 530 may also include other input devices 532. Specifically, other input devices 532 may include, but are not limited to, one or more of a physical keyboard, function keys (such as volume control buttons, switch buttons, etc.), trackball, mouse, joystick, and so on.

The display unit 540 may be used to display information input by the user or provided to the user and various graphical user interfaces of the user equipment 500. These graphical user interfaces may be composed of graphics, text, icons, videos, and any combination thereof. The display unit 540 may include a display panel 541. Alternatively, the display panel 541 may be configured in the form of liquid crystal display (LCD), organic light-emitting diode (OLED), or the like. Further, the touch-sensitive surface 531 may cover the display panel 541, and when the touch-sensitive surface 531 detects a touch operation on or near it, it is transmitted to the processor 580 to determine the type of touch event, and then the processor 580 according to the touch event provides corresponding visual output on the display panel 541. Although in FIG. 5, the touch-sensitive surface 531 and the display panel 541 are implemented as two independent components to realize the input and output functions, in some embodiments, the touch-sensitive surface 531 and the display panel 541 may be integrated to realize the input and output functions. The display interface of the mobile terminal in the above embodiment may be represented by the display unit 540, and the content associated with the current mobile payment information and the current store information may be displayed on the display unit 540 of the user equipment 500, that is, the displayed content of the display interface can be displayed by the display unit 540.

The user equipment 500 may further include at least one sensor 550, such as a light sensor, a motion sensor, and other sensors. Specifically, the light sensor may include an ambient light sensor and a proximity sensor, wherein the ambient light sensor may adjust the brightness of the display panel 541 according to the brightness of the ambient light, and the proximity sensor may close the display panel 541 and/or backlight source when the user equipment 500 moves to the ear. As a type of motion sensor, the gravity acceleration sensor can detect the magnitude of acceleration in various directions (generally three axes), and can detect the magnitude and direction of gravity when at rest, and can be used to identify mobile phone gesture applications (such as horizontal and vertical screen switching, related games, magnetometer posture calibration), vibration recognition related functions (such as pedometer, tap), etc. As for the user equipment 500, other sensors such as gyroscope, barometer, hygrometer, thermometer, infrared sensor, etc. can be configured, and relevant description shall not be repeated.

The audio circuit 560, the speaker 561, and the microphone 562 may provide an audio interface between the user and the user equipment 500. The audio circuit 560 may transmit the received electrical signals into electrical signals after conversion to the speaker 561, which converts the speakers 561 into sound signals for output; on the other hand, the microphone 562 converts the collected sound signals into electrical signals, which, after being received by the audio circuit 560, is converted into audio data, and then processed by the audio data output processor 580, and then sent to, for example, another terminal through the RF circuit 510, or the audio data is output to the memory device 520 for further processing. The audio circuit 560 may also include an earplug jack to provide communication between peripheral headphones and the user equipment 500.

The user equipment 500 can help users send and receive emails, browse web pages, and access streaming media through the transceiver 570 (such as a Wi-Fi module), which provides users with wireless broadband Internet access. Although FIG. 5 shows the transceiver 570, it can be understood that it is not a necessary component of the user equipment 500, and can be omitted as needed without changing the scope of the essence of the invention.

The processor 580 is the control center of the user equipment 500, and uses various interfaces and lines to connect various parts of the entire mobile phone, by running or executing software programs and/or modules stored in the memory device 520, and calling data stored in the memory device 520 to execute various functions and process data of the user equipment 500, thereby performing overall monitoring on the mobile phone. Optionally, the processor 580 may include one or more processing cores; in some embodiments, the processor 580 may integrate an application processor and a modem processor, wherein the application processor mainly processes an operating system, a user interface, and applications, etc., and the modem processor mainly processes wireless communication. It is understandable that the modem processor may not be integrated into the processor 580.

The user equipment 500 further includes a power supply 590 (such as a battery) that supplies power to various components. In some embodiments, the power supply may be logically connected to the processor 580 through a power management system, so as to manage charging, discharging, and functions such as power management. The power supply 590 may also include any component such as one or more DC or AC power supplies, recharging systems, power failure detection circuits, power converters or inverters, and power status indicators.

Although not shown, the user equipment 500 may further include a camera (such as a front camera and a rear camera), Bluetooth module, etc., which will not be repeated here. Specifically, in this embodiment, the display unit of the mobile terminal is a touch screen display, the mobile terminal further includes a memory, and one or more programs, wherein one or more programs are stored in the memory, and are configured to be executed by the one or more processors, including instructions for performing the following operations.

In another aspect of the present application, the proposed method may not be limited to UE. Any network node in the telecommunication system may be adaptable. Therefore, a communication method is provided for a network node to access unlicensed spectrums in a serving cell of a telecommunication system. The communication method in the embodiment, may be a UE-to-BS communication, but may also be possible to be implemented in a UE-to-UE communication, or a BS-to-BS communication with minor modifications.

Firstly, a configuration message is received by the network node, comprising a duration candidate list co-DurationList-r16 comprising a plurality of duration candidates.

Secondly, a control message is received by the network node, comprising information for determining a RCOD.

Thereafter, the network node determines a RCOD to occupy the unlicensed spectrum based on the configuration message and the control message.

Upon successful reception of the configuration message, the network node may decode the configuration message to be configured with the duration candidate list co-DurationList-r16.

The control message may comprise a COD field configured to indicate the remaining channel occupancy duration RCOD. So that upon successful reception of the control message, the network node may be able to decode the control message to be configured with the COD field.

The configuration message provided with a RRC message, and the control message can be a DCI format 2_0 message.

Furthermore, a channel access procedure can be performed by the network node to detect unlicensed spectrums not in use. When an outcome of the channel access procedure indicates that an unlicensed spectrum is not in use, the network node is allowed to perform transmission and/or reception over the unlicensed spectrum within the RCOD. Specifically, the channel access procedure is a listen before talk (LBT) procedure, in which radio spectrums are sensed by a physical layer of the network node. The outcome of the channel access procedure, the duration candidate list co-DurationList-r16, and the COD field may then be sent to a higher layer of the network node to determine the RCOD.

In a particular embodiment, if the network node is a mobile station or a UE, the physical layer of the network node is referred to as a transceiver in the UE, and the higher layer of the network node is referred to as a processor in the UE.

Furthermore, the duration candidates in the duration candidate list co-DurationList-r16 may be integers ranging from 1 to 560. A duration candidate of 0 may define one or more of the following situations: the duration candidate list co-DurationList-r16 being ready or valid in the configuration message; an invalid duration candidate; and an outcome of the channel access procedure being failed for the serving cell.

The COD field may be configured to indicate a duration candidate for a serving cell starting from a slot where the network node detects the control message. The configuration message further comprises information of channel occupancy duration per cell co-DurationPerCell-r16. The information of channel occupancy duration per cell co-DurationPerCell-r16 may further comprise: a total number of duration candidates in the duration candidate list co-DurationList-r16. A length of the COD field may be determined based on the total number of duration candidates in the duration candidate list co-DurationList-r16 using the formula:

$$\max\{\lceil \log_2 N \rceil, 1\}$$

where N is the total number of duration candidates in the duration candidate list co-DurationList-r16.

Furthermore, when determining the RCOD, if the information of channel occupancy duration per cell co-DurationPerCell-r16 is absent, an SFI-index field value is obtained from the control message as an alternative source to solve the RCOD. The RCOD for a serving cell may be determined based on a number of slots starting from the slot where the network node detects the control message.

Furthermore, if the COD field or the SFI-index field value are obtained, a process of occupancy duration determination is proceeded. It is determined whether the RCOD comprises more than one uplink to downlink UL-to-DL switching points. If so, the first occurred UL-to-DL switching point is assessed as an end point of the RCOD. Specifically, the RCOD is corresponding to the RCOD with calculated start and end points.

Furthermore, when determining the RCOD, if the network node is configured to receive a physical downlink shared channel PDSCH or a channel state information reference signal CSI-RS in a set of symbols within a slot, receiving the PDSCH or the CSI-RS only when all criteria are met; wherein the criteria comprises: the SFI-index field value indicating that the set of symbols within the slot are downlink and within a range of the RCOD.

Furthermore, the criteria may further comprise: in the range of the RCOD, no set of symbols in a slot prior to the PDSCH or the CSI-RS being indicated as uplink by the SFI-index field value.

The embodiment of the communication method described above is executed by a network node, which is also incorporated in one of the subject matters claimed in the present application. The network node may comprise a processor, a memory device, and a transceiver, wherein the memory device comprises program codes executable by the processor to perform the method through the transceiver for accessing unlicensed spectrums in a telecommunication system.

In a further aspect of the present application, a communication method implemented by the system side is provided. The system side may be referred to as any higher layer in the telecommunication system and is not limited to a core network or a base station. In the embodiment of a communication method implemented from the system side, a network node is enabled to access unlicensed spectrums in a serving cell of a telecommunication system. The telecommunication system may firstly transmit, through a base station, a configuration message to configure a network node (such as a UE) attached to the telecommunication system. Specifically, the configuration message provides a duration candidate list co-DurationList-r16 comprising a plurality of duration candidates, allowing the network nodes to be configured for successive communications. For example, the duration candidate list co-DurationList-r16 can be generated by a higher layer of the telecommunication system (the network) from a list of total possible integer values ranging from 1 to 560. That is, the network can configure different values from the range to create the duration candidate list DurationList-r16 containing N elements or entries, wherein each element or entry is a configured COT duration value (integer value). In other words, the duration candidate list co-DurationList-r16 can be a subset of another list having integers ranging from 1 to 560.

In provision of the control message, the telecommunication system may generate a channel occupancy duration COD field in DCI format 2_0 with a length based on the total number of duration candidates in the duration candidate list co-DurationList-r16 using a roundup function: $\max\{\lceil \log_2 N \rceil, 1\}$, where N is the total number of duration candidates in the duration candidate list co-DurationList-r16.

Furthermore, the configuration message provided by the telecommunication system may further comprise information of channel occupancy duration per cell co-DurationPerCell-r16, in which a total number of duration candidates in the duration candidate list co-DurationList-r16 is recorded.

Furthermore, an SFI-index field value is also provided by the telecommunication in the DCI format 2_0 to specify slot formats for a number of slots. For some cases, the COD field may not be provided. Without the COD field, the network node can still use the SFI-index field value to determine the RCOD.

A further function of the telecommunication system is to configure the network node to receive a physical downlink shared channel PDSCH or a channel state information reference signal CSI-RS in a set of symbols within a slot. In a preferred embodiment, the PDSCH or the CSI-RS are accepted by the network node only when the SFI-index field value indicating that the set of symbols within the slot are downlink and within a range of the RCOD. In addition to the conditions above, one more criterion may also be satisfied for the network node to receive the PDSCH or the CSI-RS. That is, in the range of the RCOD, no set of symbols in a slot prior to the PDSCH or the CSI-RS are indicated as uplink by the SFI-index field value.

Thereafter, the telecommunication system may transmit, through the base station, a control message comprising information for determining a RCOD. A network node (such as a mobile station or a UE) attached to the telecommunication system is therefore enabled by the configuration message and the control message to determine a RCOD to occupy the unlicensed spectrum. As described, the first information is a COD field comprising a duration candidate corresponding to one of the duration candidates in the duration candidate list co-DurationList-r16. If the first information is not available for the network node, the network node may use a second information in the control message to determine the RCOD. In short, the second information can be an SFI-index field value in the DCI format 2_0 message.

The embodiment of the communication method executable from the system side, may partially involve with a base station comprising a processor, a memory device, and a transceiver, wherein the memory device comprises program codes executable by the processor to perform relevant transmissions and receptions through the transceiver.

In an embodiment of the base station, the transceiver transmits a control message comprising a channel occupancy duration COD field configured to indicate a duration candidate, such that the UE is configured with the channel occupancy duration COD field to enable transmission and/or reception over unlicensed spectrums within a RCOD.

A further function of the base station is to transmit a configuration message comprising a duration candidate list co-DurationList-r16 comprising a plurality of duration candidates, such that the UE is configured with the duration candidate list co-DurationList-r16 when successfully decoding the configuration message.

The embodiments of the communication method in the present application are mainly operations between the telecommunication system and the UE, with the base station controlled by the network (a.k.a., the higher layer of the telecommunication system) serving as access points. To be further noted, a higher layer of the base station is referred to programmatic operations executed in the processor of the base station. On the other hand, a physical layer of the base station is generally referred to as the transceiver of the base station.

Figure 6:
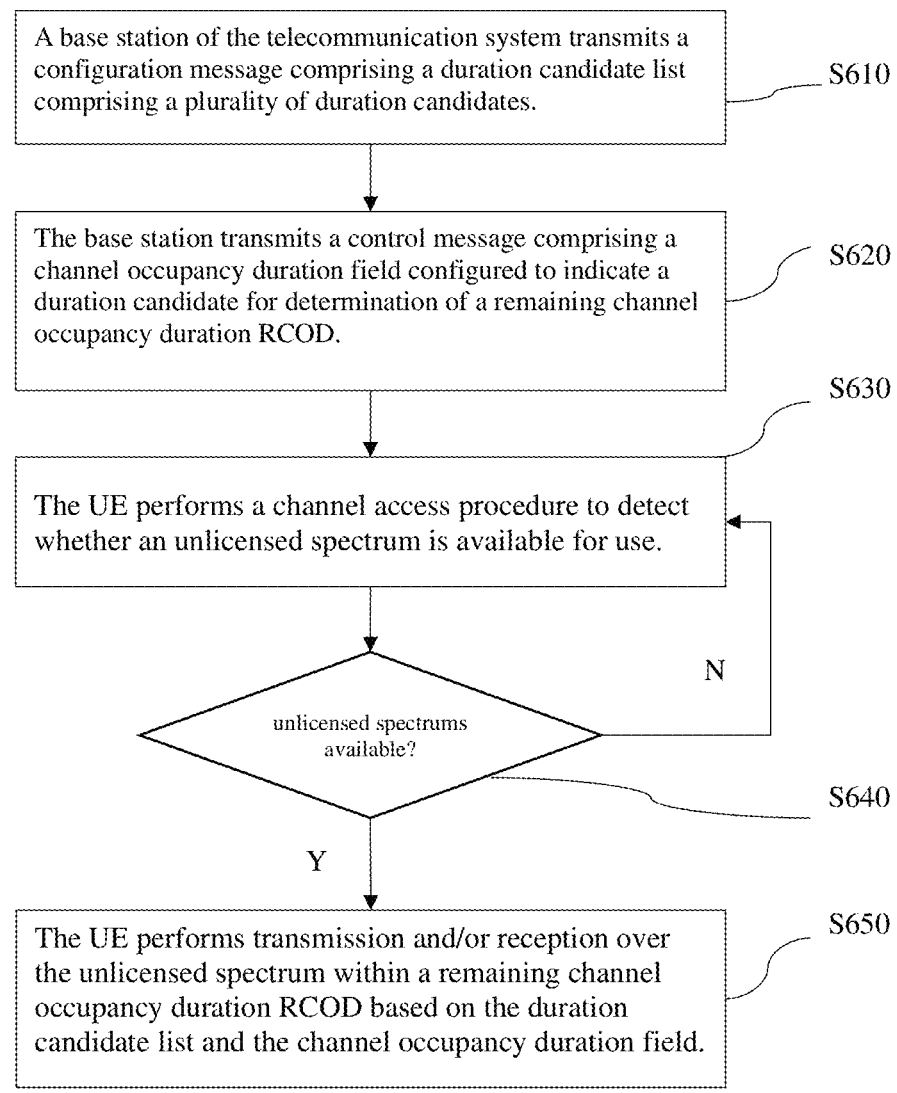
FIG. 6 is a flowchart of a communication method in a telecommunication system.

FIG. 6 is a flowchart of a communication method in a telecommunication system. The proposed method can be summarized as the following steps. In step S610, a base station of the telecommunication system transmits a configuration message comprising a duration candidate list co-DurationList-r16 comprising a plurality of duration candidates, such that the UE is configured with the duration candidate list co-DurationList-r16 when successfully decoding the configuration message. In step S620, the base station of the telecommunication system transmits a control message comprising a COD field configured to indicate a duration candidate, such that the UE is configured with the COD field when successfully decoding the control message. In step S630, the UE performs a channel access procedure to detect whether an unlicensed spectrum is available for use (not in use). In step S640, a decision tree is presented based on the channel access procedure, wherein Y goes to step S650, and N goes back to step S630. In step 650, when an outcome of the channel access procedure indicates that the unlicensed spectrum is available, the UE may be allowed to perform transmission and/or reception over the unlicensed spectrum within a RCOD based on the duration candidate list co-DurationList-r16 and the COD field.

In a preferred embodiment, the configuration message can be provided with a RRC message, and the control message may be a DCI format 2_0 message.

The channel access procedure may be a listen before talk (LBT) procedure comprising: sensing radio spectrums by a physical layer of the UE to determine whether the unlicensed spectrum may be in use; and passing the outcome of the radio spectrum sensing, the duration candidate list co-DurationList-r16, and the COD field to a higher layer of the UE to determine the RCOD.

The configuration message may further comprise information of channel occupancy duration per cell co-DurationPerCell-r16.

The duration candidates in the duration candidate list co-DurationList-r16 may be integers ranging from 1 to 560; wherein duration candidate of 0 defines one or more of the following situations: the duration candidate list co-DurationList-r16 being ready or valid in the configuration message;

an invalid duration candidate; and the outcome of the radio spectrum sensing being failed for the serving cell.

The COD field may be configured to indicate a duration candidate for a serving cell starting from a slot where the UE detects the control message.

The information of channel occupancy duration per cell co-DurationPerCell-r16 may further comprise a total number of duration candidates in the duration candidate list co-DurationList-r16.

The UE may determine a length of the COD field based on the total number of duration candidates in the duration candidate list co-DurationList-r16 using the formula:

$$\lceil \log_2 N \rceil$$

where N may be the total number of duration candidates in the duration candidate list co-DurationList-r16.

In one case, when the total number of duration candidates in the duration candidate list co-DurationList-r16 is only 1, the length of the COD field is deemed to be 1 bit. That is, a preferred formula to determine the total number of duration candidates in the duration candidate list co-DurationList-r16 would be:

$$\max\{\lceil \log_2 N \rceil, 1\}$$

Sometimes the UE may fail to obtain the information of channel occupancy duration per cell co-DurationPerCell-r16 for some other reasons. As an alternative solution to determine the RCOD, the UE may obtain an SFI-index field value from the control message, and determine the RCOD for a serving cell based on a number of slots starting from a slot where the UE detects the control message, with the slot format of the slot specified by the SFI-index field value.

Figure 7:
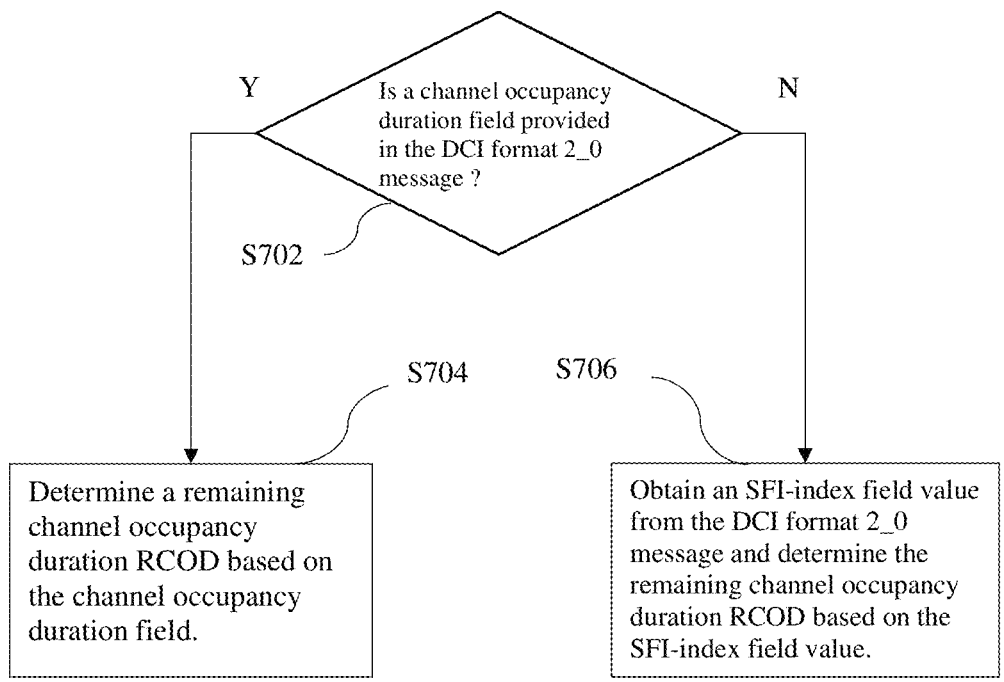
FIG. 7 is a flowchart of occupancy duration determination according to the control message.

FIG. 7 is a flowchart of occupancy duration determination according to the control message. In this embodiment, the RCOD is referred to as an estimation of the RCOD, including a start point and an end point. In S702, it is determined whether the COD field is provided in the DCI format 2_0 message. If so, step S704 is proceeded, wherein the COD field is used to determine the RCOD. The start point is generally dependent on the timing when the DCI format 2_0 message is detected or decoded. The end point is generally based on the field value of the COD field in the DCI format 2_0 message, and may be variable based on different embodiments described herein. For the case where the COD field is not provided, step S706 is processed. An SFI-index field is obtained from the DCI format 2_0 message to determine the RCOD. Likewise, the start point of the RCOD is generally based on the timing when the SFI-index field value is decoded. The end point of the RCOD is generally based on the RCOD, but can further be varied under different circumstances.

When the COD field or the SFI-index field value are obtained, if the RCOD comprises more than one uplink to downlink UL-to-DL switching points, the UE deems a first occurred UL-to-DL switching point as an end point of the RCOD.

If the UE is configured to receive a physical downlink shared channel PDSCH or a channel state information reference signal CSI-RS in a set of symbols within a slot, the UE receives the PDSCH or the CSI-RS only when all criteria are met; wherein the criteria comprise: the SFI-index field value indicating that the set of symbols within the slot may be downlink and within a range of the RCOD. With such criteria, there is no need to check the UL-to-DL switching point to determine the end point of the RCOD.

The criteria may further comprise: in the range of the RCOD, no set of symbols in a slot prior to the PDSCH or the CSI-RS being indicated as uplink by the SFI-index field value. With the further added criteria, the UL-to-DL switching point is needed to be checked to determine the end point of the RCOD. In other words, if the UE is configured by the higher layers to receive PDSCHs or CSI-RS s in a set of symbols of a slot, the UE receives the PDSCHs or the CSI-RSs in the set of symbols of the slot only if an SFI-index field value in a DCI format 2_0 message indicates the set of symbols of the slot as downlink (D) and within a range of the RCOD corresponding to the channel occupancy duration field in the DCI format 2_0 message, and there is no set of symbols in a slot prior to the PDSCHs or the CSI-RSs indicated as uplink (U) within the range of the RCOD.

Figure 8:
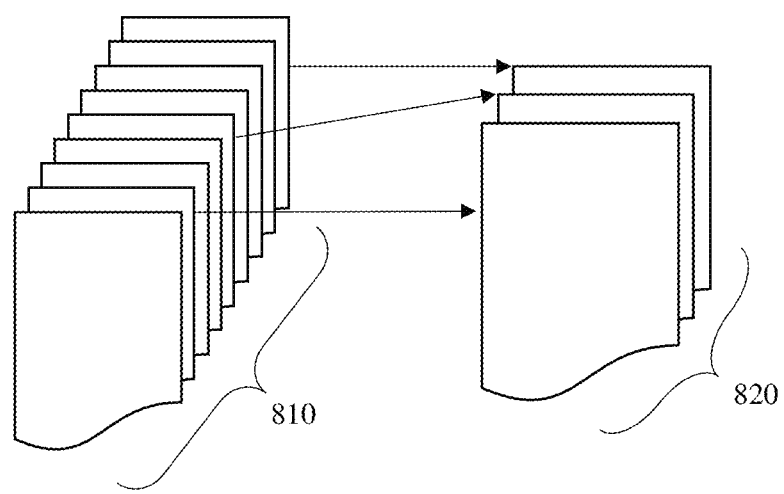
FIG. 8 is a diagram of the duration candidate list co-DurationList-r16 generated from a list of total possible duration candidates according to an embodiment of the present application.

FIG. 8 is a diagram of the duration candidate list co-DurationList-r16 generated from a list of total possible duration candidates according to an embodiment of the present application. In one embodiment of the present application, the core network may firstly generate a duration candidate list 820, that is, a list of duration candidates. Preferably, the duration candidate list 820 can be generated from a list of total possible duration values 810. For example, one or more duration candidates may be selected from the list of total possible duration values 810 based on certain conditions to generate the duration candidate list 820. As such, it can be understood that the duration candidate list 820 is configured as a subset of the list of total possible duration values 810, comprising a plurality of duration candidates cherry picked from the list of total possible duration values 810.

Thereafter, a base station may transmit toward one or more serving cells, a RRC message configured by the core network with the duration candidate list 820. The duration candidate list 820 co-DurationList-r16 is thereby delivered to one or more UEs within coverages of one or more serving cells. The UEs may then be able to initialize NRU communications upon successfully configured with the duration candidate list 820 in the RRC message.

In implementation, the duration candidates can be integers ranging from 1 to 560. One of the duration candidates may be set to 0 to indicate special events or exceptions. For example, an exception may be defined in the communication protocol to specify the situation when the duration candidate list co-DurationList-r16 in the configuration message is not ready or invalid. Alternatively, a duration candidate of value 0 can also be defined to indicate an invalid COT duration value.

When the UE is configured by the duration candidate list co-DurationList-r16 through the RRC message, a basis for the NRU communication is established. In successive NRU communications, the UE needs further information from the base stations to dynamically determine the RCOD to occupy the unlicensed channel on a per frame basis.

In one embodiment, a DCI format 2_0 message may be configured with a location of a COD field by an information element co-DurationPerCell-r16, allowing the UE to locate the COD field when receiving the DCI format 2_0 message. The COD field is configured to indicate a duration candidate, and a symbol of a slot where the UE detects the DCI format 2_0 message is assessed as a start point of the RCOD. Specifically, the indication provided by the COD field is corresponding to one of the duration candidates in the duration candidate list co-DurationList-r16. For example, when the UE successfully decodes the COD field from the DCI format 2_0 message, the UE may find a corresponding duration candidate from the duration candidate list co- DurationList-r16 based on the COD field, and proceeds to the NRU communication within a RCOD determined based on the duration candidate.

Figure 9:
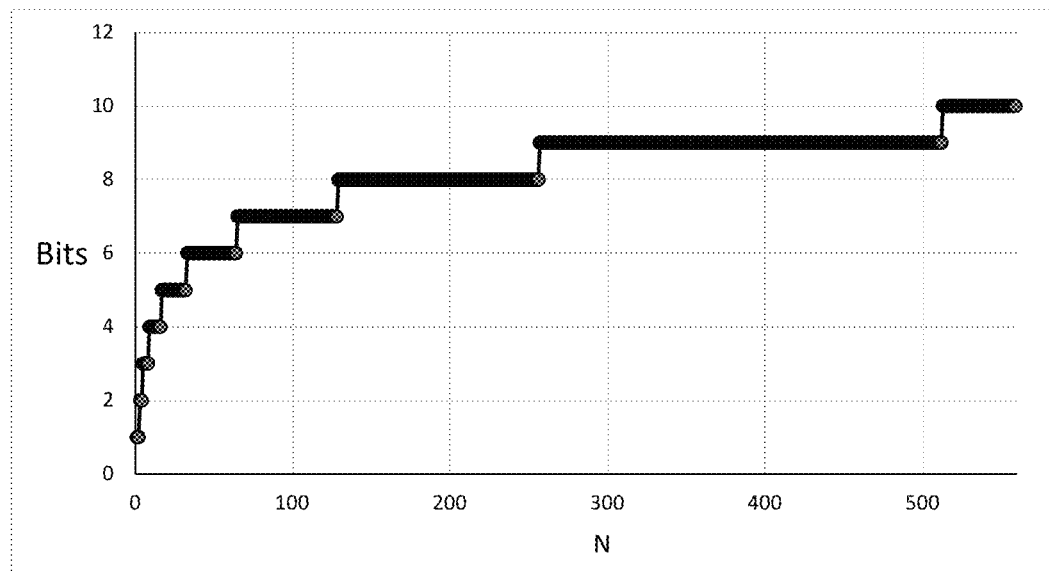
FIG. 9 is a diagram showing determination of the field length of the COD field according to an embodiment of the present application.

FIG. 9 is a diagram showing determination of the field length of the COD field according to an embodiment of the present application. The vertical axis is the field length of the COD field (Bits), and the horizontal axis is the number of duration candidates in a duration candidate list co-DurationList-r16 (N). To further improve the efficiency of communication, the UE may directly determine the RCOD based on a field length of the COD field. The COD field can be configured in a DCI format 2_0 message. Specifically, the field length is the number of bits (a.k.a. bit-width) of the COD field. The field length can be calculated based on a roundup function of $\log_2 N$, where N is a total number of the duration candidates in the duration candidate list co-DurationList-r16. That is, the length of the COD field is dependent on the total number of duration candidates in the duration candidate list co-DurationList-r16. If the duration candidate list co-DurationList-r16 has N duration candidates, the field length of the COD field is configured by a roundup function to be an integer most close to but no less than the value of $\log_2 N$. A duration candidate of value 0 can be interpreted by the UE as a special event or an exception, such as LBT failure of the serving cell.

In one embodiment, the network may configure only one duration candidate when generating the duration candidate list co-DurationList-r16, leading to $\lceil \log_2 N \rceil = 0$. The COD field, if configured anyway, must have at least 1 bit to maintain its function. Thus, the formula to specify the field length of the COD field is preferably defined as max $\{\lceil \log_2 N \rceil, 1\}$ bit, where N is the total number of duration candidates in the duration candidate list co-DurationList-r16. As such, the determination of the field length is implemented. With the roundup function of the log function of N shown in FIG. 9, a stepwise lookup table can be implemented wherein large amounts of possible values are mapped into a few bits, thereby simplifying the determination of the RCOD, and adding flexibility to the communication system. For example, when the COD field has a candidate duration N of value 100, the field length is 8 bits. For a candidate duration N ranging from 257 to 512, the field length would be 9 bits. Furthermore, when the COD field has a candidate duration of value 1, by design, the corresponding field length would be at least 1 bit.

Furthermore, the COD field information provided in the DCI format 2_0 message allows a higher layer of the UE to configure and prepare for the occupancy of the unlicensed spectrum before the LBT procedure is performed. The efficiency and reliability of the communication in the unlicensed spectrums can be improved.

In a preferred embodiment, the number of bits or bit-width of the COD field can be configured in an information element co-DurationPerCell-r16. That is, the COD field is indicated by the information element co-DurationPerCell-r16 in a DCI format 2_0 message. A RCOD for the serving cell starting from a slot where the UE detects the DCI format 2_0 can be determined based on the field length. Preferably, the time unit indicated by the duration candidate is "slot". The time units may further be quantized into symbols or any other scale for more sophisticated operations.

For variable reasons, the UE may fail to obtain the information element co-DurationPerCell-r16 from a DCI format 2_0 message. In the absence of the information co-DurationPerCell-r16, an SFI-index field value in the DCI 2_0 message may be used to determine the RCOD for the serving cell. The SFI-index field value in the DCI 2_0 message may define slot formats of each slots in successive frames. For example, a slot format of each slot or symbol may be downlink (D), uplink (U) or flexible (F). Preferably, the remaining channel occupancy is deemed as a number of slots or symbols starting from a slot or a symbol where the UE detects the DCI format 2_0 message.

When a UE obtains the COD field or the SFI-index field value, if there are more than one uplink to downlink (UL-to-DL) switching points in the RCOD, the UE determines that the RCOD shall be terminated at the first UL-to-DL switching point.

In some embodiments, the UE may not need to validate the RCOD for certain types of receptions, such as a channel state information reference signal (CSI-RS) reception procedure. That is, the UE does not need to determine the UP-to-DL switching point when the reception type is CSI-RS.

In the case that the UE is configured to receive a physical downlink shared channel (PDSCH) or a CSI-RS within a set of symbols within a slot, the UE performs the reception only if the set of symbols of the slot are all downlink and within a range of a RCOD. In such a case, the UE does not need to validate the RCOD. That is, the UE can skip the determination of the UP-to-DL switching point.

For another example, the UE may need to validate the RCOD, that is, to determine the UP-to-DL switching point to identify the end of the RCOD. If the UE is configured to receive a PDSCH or a CSI-RS in a set of symbols within a slot, the UE performs the reception only if the set of symbols of the slot are all downlink and within a range of a RCOD, and there is not a set of symbols in a slot prior to the PDSCH or the CSI-RS that are indicated as uplink within the range of the RCOD. As described in the aforementioned embodiments, the slot formats of the set of symbols may be indicated by an SFI-index field value in the DCI format 2_0 message, and the RCOD may be corresponding to the COD field in the DCI format 2_0 message.

In the aforementioned embodiments, a telecommunication system comprises a plurality of network nodes working together to provide services over coverage of multiple serving cells. The actual names of the network nodes may vary with different versions of specs. To be noted, the network nodes are generally referred to as nodes interconnected through radio connections such as the base stations and the UEs. A higher layer of the telecommunication system may be referred to as "the network" since it involves a sophisticated infrastructure of the 3GPP standard which is not introduced herein as an easy way to describe any node or unit out of the scope of the concerned operations, protocols, and/or handshakes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims. Although the application has disclosed the above with preferred embodiments, the above preferred embodiments are not intended to limit the application. Ordinary technical personnel in the art can make various modifications and refinements without departing from the spirit and scope of the application. Therefore, the scope of protection of the application is subject to the scope defined in the claims.

What is claimed is:

1. A communication method for user equipment (UE) to communicate in a telecommunication system comprising a core network and at least one base station operating in a serving cell, comprising:
receiving, by the UE from the base station, a first information from the base station, wherein the first information is used to determine a remaining channel occupancy duration RCOD for the serving cell,
wherein the first information comprises a first indication field and/or a second indication field, wherein the first indication field indicates a duration candidate among a set of duration candidates, and wherein the set of duration candidates are configured by the base station to the UE through a radio resource control (RRC) message.

2. The communication method as claimed in claim 1, wherein the first information comprises a downlink control information (DCI) format 2_0.

3. The communication method as claimed in claim 2, wherein:
the communication method further comprises: deeming a slot where the first information is detected as a start point of the remaining channel occupancy duration RCOD.

4. The communication method as claimed in claim 1, wherein the first indication field has a length of M bits, where the length value M is an integer;
wherein the length value M is determined by a roundup function $\lceil \log_2 N \rceil$ or max $\{\lceil \log_2 N \rceil, 1\}$, where N is a number of the set of duration candidates.

5. The communication method as claimed in claim 1, wherein the duration candidate specified in the first indication field comprises one or more symbols or slots;
wherein the second indication field comprises a slot format indicator (SFI)-index field value indicating slot formats of a number of slots.

6. The communication method as claimed in claim 2, further comprising: using the second indication field to determine the remaining channel occupancy duration RCOD for the serving cell when the first indication field is absent;
wherein the remaining channel occupancy duration RCOD for the serving cell is determined to be a number of slots starting from a slot where the first information is detected;
wherein the first indication field is deemed absent when information of channel occupancy duration per cell is not provided or unavailable;
wherein the second indication field defines a number of slots for the remaining channel occupancy duration RCOD.

7. The communication method as claimed in claim 5, further comprising:
when determining the remaining channel occupancy duration RCOD, if more than one uplink to downlink (UL-to-DL) switching points are determined in a range of the remaining channel occupancy duration RCOD, the UE deeming a first occurred UL-to-DL switching point as an end point of the remaining channel occupancy duration RCOD.

8. The communication method as claimed in claim 5, further comprising:
if the UE is configured to receive a physical downlink shared channel (PDSCH) or a channel state information reference signal (CSI-RS) in a set of symbols within a slot, the UE receiving the PDSCH or the CSI-RS only when all criteria are met; wherein the criteria comprises:
the SFI-index field value indicating that the set of symbols within the slot are downlink and within a range of the remaining channel occupancy duration RCOD;
wherein the criteria further comprises:
in the range of the remaining channel occupancy duration RCOD, no set of symbols in a slot prior to the PDSCH or the CSI-RS being indicated as uplink by the SFI-index field value.

9. A communication method for a telecommunication system to enable a network node to communicate in a serving cell, comprising:
transmitting a control message comprising information for determining a remaining channel occupancy duration RCOD, to configure the network node to determine a remaining channel occupancy duration RCOD for the serving cell, and
transmitting a configuration message comprising a duration candidate list comprising a set of duration candidates, the set of duration candidates being configured by a base station to UE through a radio resource control (RRC) message.

10. A base station, operating in a telecommunication system to provide services to one or more user equipment (UE) within one or more serving cells, wherein:
the base station comprises a processor, a memory device, and a transceiver working together to communicate with a higher layer of telecommunication system and the UE;
the transceiver transmits a control message comprising a channel occupancy duration COD field configured to indicate a duration candidate, such that the UE is configured with the channel occupancy duration COD field to enable transmission and/or reception over unlicensed spectrums within a remaining channel occupancy duration RCOD,
the base station further transmits a configuration message comprising a duration candidate list comprising a plurality of duration candidates, such that the UE is configured with the duration candidate list when successfully decoding the configuration message, wherein the configuration message is provided with a radio resource control (RRC) message.

11. The base station as claimed in claim 10, wherein: the control message is a downlink control indicator (DCI) format 2_0 message.

12. The base station as claimed in claim 11, wherein the configuration message further comprises information of channel occupancy duration per cell;
wherein the duration candidate list comprises a plurality of duration candidates as integers ranging from 1 to 560; and
a duration candidate of 0 defines one or more of the following situations:
the duration candidate list being ready or valid in the configuration message;
an invalid duration candidate; and
an outcome of a channel access procedure by the UE being failed for the serving cell.

13. User equipment (UE) comprising a processor, a memory device, and a transceiver, wherein the memory device comprises program codes executable by the processor to perform a method through the transceiver for communicating in a telecommunication system comprising a core network and a base station, wherein:

the UE receives a first information from the base station, wherein the first information is used to determine a remaining channel occupancy duration RCOD available for the UE to occupy the unlicensed spectrum, wherein the first information comprises a first indication field and/or a second indication field, wherein the first indication field indicates a duration candidate among a set of duration candidates, and wherein the set of duration candidates are configured by the base station to the UE through a radio resource control (RRC) message.

14. The UE as claimed in claim 13, wherein the first information comprises a downlink control information (DCI) format 2_0.

15. The UE as claimed in claim 14, wherein the first indication field has a length of M bits, where the length value M is an integer;

wherein the length value M is determined by a roundup function $\lceil \log_2 N \rceil$ or max $\{\lceil \log_2 N \rceil, 1\}$, where N is a number of the set of duration candidates.

16. The UE as claimed in claim 14, wherein the duration comprises one or more symbols or slots;

wherein the second indication field comprises a slot format indicator (SFI)-index field value.

17. The UE as claimed in claim 14, wherein: the UE uses the second indication field to determine the remaining channel occupancy duration RCOD for the serving cell when the first indication field is absent;

wherein the remaining channel occupancy duration RCOD for the serving cell is determined to be a number of slots starting from the slot where the UE detects the second indication field;

wherein the first indication field is deemed absent when information of channel occupancy duration per cell is not provided or unavailable;

wherein the remaining channel occupancy duration RCOD comprises a number of slots indicated by the second indication field.

18. The UE as claimed in claim 16, wherein:

when determining the remaining channel occupancy duration RCOD, if more than one uplink to downlink (UL-to-DL) switching points are determined in a range of the remaining channel occupancy duration RCOD, the UE deems a first occurred UL-to-DL switching point as an end point of the remaining channel occupancy duration RCOD.

19. The UE as claimed in claim 16, wherein:

if the UE is configured to receive a physical downlink shared channel (PDSCH) or a channel state information reference signal (CSI-RS) in a set of symbols within a slot, the UE receives the PDSCH or the CSI-RS only when all criteria are met; wherein the criteria comprises:

the SFI-index field value indicating that the set of symbols within the slot are downlink and within a range of the remaining channel occupancy duration RCOD;

wherein the criteria further comprises:

in the range of the remaining channel occupancy duration RCOD, no set of symbols in a slot prior to the PDSCH or the CSI-RS being indicated as uplink by the SFI-index field value.

\* \* \* \* \*